United States Patent

[11] 3,584,856

| [72] | Inventor | Jacques A. Desbois<br>Montbeliard, France |
|---|---|---|
| [21] | Appl. No. | 789,817 |
| [22] | Filed | Jan. 8, 1969 |
| [45] | Patented | June 15, 1971 |
| [73] | Assignees | Automobiles Peugeot<br>Paris, France;<br>Regie Nationale Des Usines Renault<br>Billancourt, France |
| [32] | Priority | Jan. 9, 1968 |
| [33] | | France |
| [31] | | 135,280 |

[54] VEHICLE SUSPENSION DEVICE
5 Claims, 5 Drawing Figs.

[52] U.S. Cl. .................................................... 267/34,
280/124

[51] Int. Cl. ........................................... B60g 11/56
[50] Field of Search ........................................ 280/124,
124.1; 267/34, 64, 65

[56] References Cited
UNITED STATES PATENTS

| 2,967,063 | 1/1961 | Mueller .......................... | 280/124 |
| 3,263,983 | 8/1966 | Bliven ........................... | 267/34X |

Primary Examiner—Philip Goodman
Attorney—Burns, Doane, Swecker & Mathis

ABSTRACT: Vehicle suspension device in which the spring and damper are connected to the body of the vehicle by different elastically yieldable connecting means. The arrangement is such that the damper is connected to the body less rigidly than the spring.

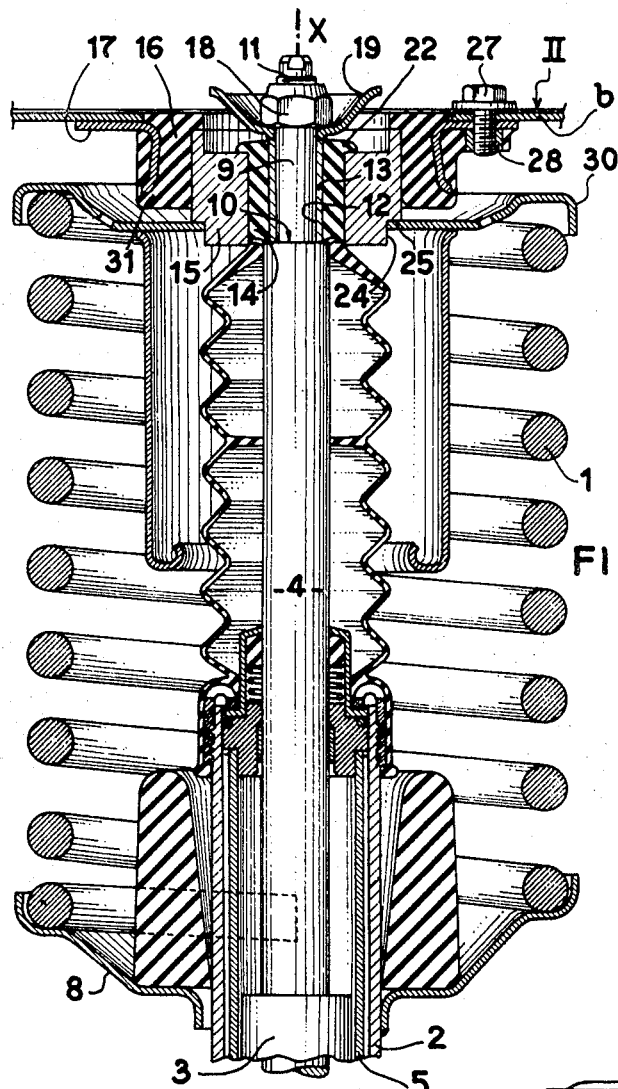
FIG. 1
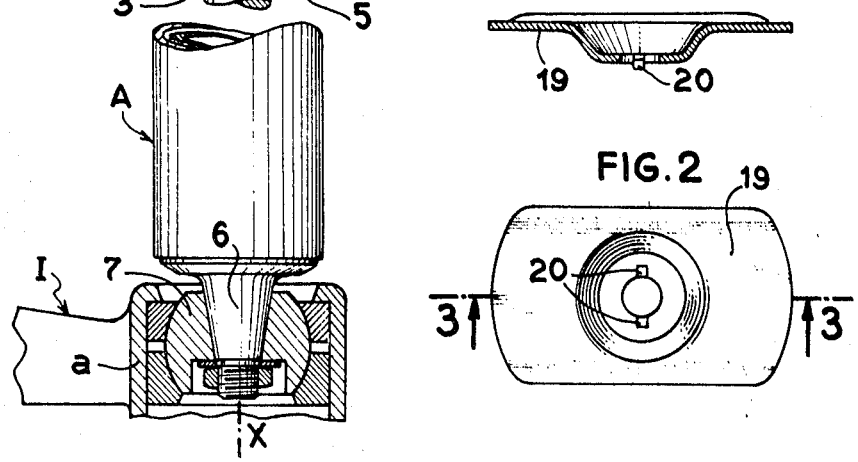
FIG. 3
FIG. 2

VEHICLE SUSPENSION DEVICE

The present invention relates to independent wheel suspension devices for vehicles and more particularly to devices of the type comprising a coil spring combined with a coaxial telescopic damper. In known devices of this type, the upper plate against which the spring bears is usually axially fixed in a rigid manner to the damper rod. Usually provided between this plate and the body of the vehicle is an annular rubber mounting element subjected to shear stress. Consequently, the damper and the spring are connected to the body with the same rigidity.

The object of the invention is to provide a suspension device of the aforementioned type which is so improved as to afford an improved insulation from the vibrations between the device and the body of the vehicle. This is achieved owing to the fact that the damper and the spring are provided with elastically yieldable means for connection to the body of the vehicle, said means being at least partly different and such that, after mounting, the connection between the damper and the body is less rigid than that between the spring and the body.

According to one embodiment, the plate against which the spring bears is connected to a metal annular element to which two concentric elastomer annular elements are vulcanized, the inner element being vulcanized internally to a metal sleeve rigidly secured to the damper rod whereas the outer element is vulcanized externally to an annular collar adapted to be rigidly secured to the body of the vehicle.

Thus, there is provided on the axis of the damper, between the spring and the body, the elastically yieldable device consisting of the outer rubber element and, between the damper and the body, in series relation, the two inner and outer elastically yieldable elements.

Further features and advantages of the invention will be apparent from the ensuing description with reference to the accompanying drawings.

In the drawings:

FIG. 1 is a longitudinal, partial, vertical sectional view of an improved suspension device according to the invention;

FIG. 2 is a plan view of the pressed-out upper element, attached to the end of the rod of the damper-forming part of the suspension device;

FIG. 3 is a longitudinal sectional view, taken along line 3—3 of FIG. 2;

Figure 4:
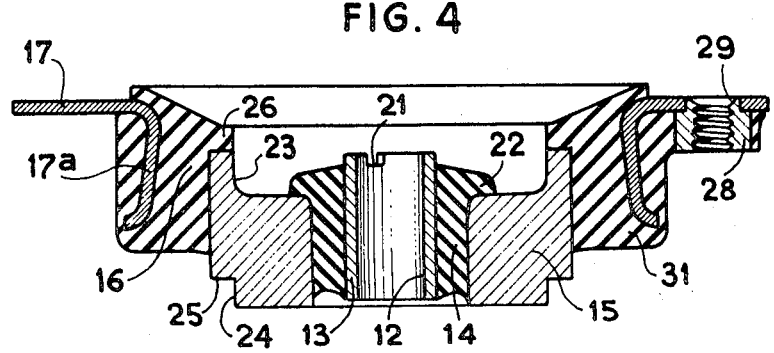
FIG. 4 is a sectional view, on a scale larger than that of FIG. 1, and in the position of rest of the assembly of the fixing means fixing the suspension device to the body or other suspended part of the vehicle.

In the embodiment shown in FIGS. 1 to 4, the suspension device is adapted to be disposed between, on one hand, a part *a* forming part of an axle or other element (such as a triangle link, stub axle or suspension triangle) of a supporting set of wheels I (which can be the driving and/or steering set of wheels) and, on the other hand, another member *b* forming part of the suspended body II of the vehicle.

This suspension device comprises, in combination, a damper A and a coil spring 1, these two parts being coaxial on axis X-X.

The damper A is of conventional type having a cylindrical body 2, a piston 3 and a piston rod 4. The piston 3, provided with two sets of valves opening in opposite directions (not shown), is slidable in a fixed skirt portion 5 integral with the cylinder 2. The latter has at its base an extension 6 for securing it to the supporting train of wheels I through a ball joint 7 or other means.

The spring 1 bears at its base on a cup 8 which is attached to the cylinder 2 by welding or other means.

This known arrangement is completed according to the invention by the device described hereinafter for connection to the suspended body II.

The piston rod 4 terminates at its upper end in a reduced portion 9 which forms a shoulder 10 and is screw-threaded at 11. This reduced portion is engaged in the center aperture 12 of the connecting device shown in the free state and fully in FIG. 4.

This device comprises, in the outward direction, a metal bushing 13 which defines said center aperture 12, a sleeve 14 of rubber or other elastomer, an annular metal member 15, a peripheral ring 16 of rubber or other elastomer, and an annular member 17.

The inner bushing 33 has such length that, in bearing against the shoulder 10 of the piston rod 4, a locknut 18 screwed on the screw-threaded end of the rod applies and clamps on the upper end face of the bushing (FIG. 1) a pressed-out oblong cup 19 FIGS. 1—3). This cup is provided with two lugs 20 which are diametrically opposed and produced by an upsetting operation, so that they extend beyond the lower face of the cup and are adapted to engage in diametrically opposed notches 21 in the bushing 13, so as to hold the cup in position relative to the bushing.

The elastically yieldable sleeve 14 is secured by vulcanization to the parts 13 and 15 and comprises at its upper end a flange 22 bearing against the annular member 15. The latter is counterbored in the upper part at 23 and reduced externally in the lower part at 24 so as to provide a shoulder 25.

The elastically yieldable ring 16 is vulcanized to the outer face of the member 15 and it overlaps at 26 the upper peripheral edge of this member 15.

The annular member 17 has an L-shaped cross section. The flange 17a is slightly frustoconical and is embedded in the rubber 16 to which it is connected by vulcanization. The other flange constitutes a plane ring and extends beyond the rubber 16 for application against the cylindrical part II to which it can be fixed for example by screws 27 (FIG. 1) screwed in nuts 28 which are riveted or welded at 29 in apertures in the member 17 and embedded in the rubber 16.

The spring 1 bears at its upper end against the plate 30, which is centered on the reduced portion 24 of the annular member 15 against the shoulder 25 of which it bears upwardly.

As can be seen, the damper A is connected to the suspended body II through two elastically yieldable elements 14 and 16 which are disposed in series relation, whereas the spring 1 is connected to the part II solely through the elastically yieldable element 16. Consequently, the connection of the damper has a rigidity distinctly less than that of the connection of the spring.

Note that the upper flange 22 of the sleeve 14 and the lower peripheral portion 31 of the ring 16 constitute travel stops when they encounter respectively the pressed-out member 19 and the plate 30. Further, in the case of an accidental fracture of the vulcanization of the rubber, the limit in the travel in both directions avoids the fracture of the connection.

Figure 5:
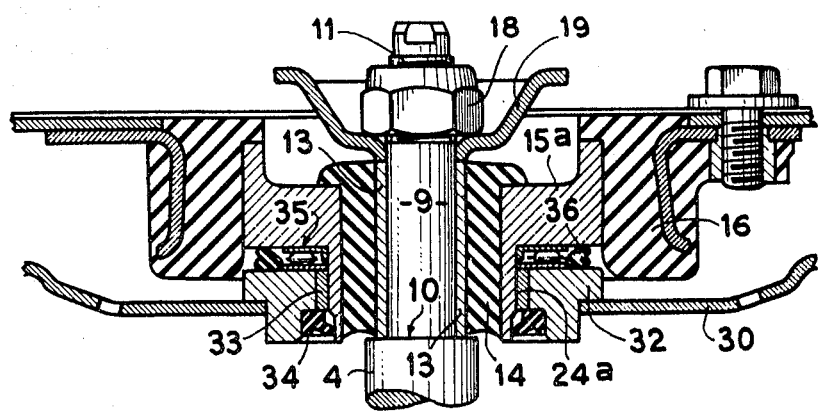
FIG. 5 is a view similar to FIG. 4 of a modification of this assembly.

FIG. 5 relates to a modification which is compatible with movement of rotation of the spring 1 about the axis X-X which can be the result of the operation of the assembly of the suspension (for example in the case of a steering wheel). In this case, the plate 30 is engaged on an auxiliary ring 32 which is mounted on the reduced portion 24a of the annular member 15a vulcanized to the rubber elements 14 and 16. Disposed between the parts 32 and 15a are: a self-lubricating ring 33 associated with a sealing washer 34, and a thrust bearing 35 having needles or other rolling or sliding elements associated with a sealing washer 36.

Although specific embodiments of the invention have been described, many modifications and changes may be made therein without departing from the scope of the invention as defined in the appended claims.

Having now described my invention, what I claim as new and desire to secure by Letters Patent is:

1. A vehicle suspension device, for interposition between a vehicle body and an unsuspended part of a vehicle, comprising a coil spring, a damper within said spring, first elastically yieldable connecting means for connecting an upper end of said spring to the body of the vehicle, second elastically yieldable connecting means for connecting an upper end of said damper to the body of the vehicle, and third means for connecting lower ends of said spring and said damper to said unsuspended part of the vehicle, said first and second means being different and such that said damper is connected to the body of the vehicle less rigidly than said spring, said first and second connecting means comprising a metal annular member, an outer annular element of elastomer and an inner annular element of elastomer, said annular elements being concentric and vulcanized to said metal annular member, a plate connected to said metal annular member, said spring having an upper end bearing against said plate, a metal bushing, said damper having a rod rigidly fixed to said bushing, said outer element of elastomer being externally vulcanized to a collar adapted to be rigidly secured to the body of the vehicle and said inner element of elastomer being internally vulcanized to said metal bushing.

2. A device as claimed in claim 1 wherein said plate bears directly against said metal annular member.

3. A device as claimed in claim 1, wherein said spring is rotatable relative to said collar, said plate being fixed to a metal ring rotatably mounted on said metal annular member, a thrust bearing being interposed between said metal ring and said metal annular member.

4. A device as claimed in claim 3, wherein said thrust bearing is a rolling bearing.

5. A vehicle comprising a body and unsprung parts, a suspension device interposed between the body and each unsprung part of the vehicle, said device comprising a coil spring, a damper within said spring, first elastically yieldable connecting means for connecting an upper end of said spring to the body of the vehicle, second elastically yieldable connecting means for connecting an upper end of said damper to the body of the vehicle, and third means for connecting lower ends of said spring and said damper to said unsuspended part of the vehicle, said first and second means being different and such that said damper is connected to the body of the vehicle less rigidly than said spring, said first and second connecting means comprising a metal annular member, an outer annular element of elastomer and an inner annular element of elastomer, said annular elements being concentric and vulcanized to said metal annular member, a plate connected to said metal annular member, said spring having an upper end bearing against said plate, a metal bushing, said damper having a rod rigidly fixed to said bushing, said outer element of elastomer being externally vulcanized to a collar adapted to be rigidly secured to the body of the vehicle and said inner element of elastomer being internally vulcanized to said metal bushing.